(12) United States Patent
Li et al.

(10) Patent No.: US 8,150,975 B2
(45) Date of Patent: *Apr. 3, 2012

(54) SYSTEM, METHOD AND APPARATUS FOR ESTABLISHING INTERACTIVE MEDIA SESSION BASED ON IP MULTIMEDIA SUBSYSTEM

(75) Inventors: Jicheng Li, Shnzhen (CN); Jun Yan, Shenzhen (CN); Xiangyang Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,164

(22) Filed: Oct. 29, 2010

(65) Prior Publication Data

US 2011/0055405 A1 Mar. 3, 2011

Related U.S. Application Data

(63) Continuation of application No. 12/192,985, filed on Aug. 15, 2008, now Pat. No. 7,917,637, which is a continuation of application No. PCT/CN2007/000557, filed on Feb. 15, 2007.

(30) Foreign Application Priority Data

Feb. 18, 2006 (CN) .......................... 2006 1 0033768

(51) Int. Cl.
*G06F 15/16* (2006.01)
(52) U.S. Cl. ...................................... 709/227
(58) Field of Classification Search .......... 709/200–203, 709/217–227, 231–232, 233
See application file for complete search history.

(56) References Cited

U.S. PATENT DOCUMENTS

| 5,671,225 | A | 9/1997 | Hooper et al. |
| 7,043,564 | B1 | 5/2006 | Cook et al. |
| 7,917,637 | B2 * | 3/2011 | Li et al. .......................... 709/228 |
| 2004/0006573 | A1 * | 1/2004 | Takashi ...................... 707/104.1 |

(Continued)

FOREIGN PATENT DOCUMENTS

CN 1151645 A 6/1997

(Continued)

OTHER PUBLICATIONS

European Patent Office, Supplementary European Search Report in European Patent Application No. 07720252.1 (Mar. 23, 2009).

(Continued)

*Primary Examiner* — Moustafa M Meky
(74) *Attorney, Agent, or Firm* — Leydig, Voit & Mayer, Ltd.

(57) ABSTRACT

A method and system for establishing an interactive media session based on IP Multimedia Subsystem, including: a terminal adapted to initiate an interactive media session request and receive a media session response; a serving-CSCF adapted to trigger the request to the application server according to a triggering rule and route the message; a proxy-CSCF adapted to forward the request and the response between the terminal and the serving-CSCF; an application server adapted to process the service request; a media control entity adapted to control resource allocation of the media carrier entity; and a media carrier entity adapted to allocate address ports for RTSP connection and RTP connection with the terminal. The present invention can be applied to a NGN network where the carrier and control are separated to improve the media delivery efficiency.

34 Claims, 6 Drawing Sheets

U.S. PATENT DOCUMENTS

| | | | |
|---|---|---|---|
| 2004/0184432 A1 | 9/2004 | Gateva et al. | |
| 2005/0283536 A1 | 12/2005 | Swanson et al. | |
| 2006/0268921 A1 | 11/2006 | Ekstrom et al. | |
| 2008/0211906 A1* | 9/2008 | Lovric | 348/143 |
| 2008/0285571 A1* | 11/2008 | Arulambalam et al. | 370/400 |
| 2009/0147787 A1 | 6/2009 | Arulambalam et al. | |
| 2010/0215339 A1* | 8/2010 | Wang et al. | 386/68 |

FOREIGN PATENT DOCUMENTS

| | | |
|---|---|---|
| CN | 1155122 A | 7/1997 |
| CN | 1595887 A | 3/2005 |
| CN | 101313554 B | 1/2012 |
| JP | 2004-312738 A | 11/2004 |
| JP | 2005-527126 A | 9/2005 |
| WO | WO 2005/025257 A1 | 3/2005 |
| WO | WO 2006/007929 A1 | 1/2006 |

OTHER PUBLICATIONS

Fan et al., "Analysis of real-time multimedia streaming transmission," IT Age, (12): 42-45 (Dec. 15, 2005).

Siemens, China Mobile, "Discussion Paper on IMS over Multicast Bearer Services," 3GPP TSG SA WG2 #50, S2-060505 (Jan. 16-20, 2006).

State Intellectual Property Office of the People's Republic of China, Written Opinion of the International Searching Authority in International Patent Application No. PCT/CN2007/000557 (Jun. 7, 2007).

State Intellectual Property Office of the People's Republic of China, Examination Report in Chinese Patent Application No. 2007800001799 (Sep. 18, 2009).

State Intellectual Property Office of the People's Republic of China, Examination Report in Chinese Patent Application No. 200610033768.4 (Jan. 8, 2010).

U.S. Appl. No. 12/192,985, filed Nov. 1, 2011.

$2^{nd}$ Office Action in corresponding Chinese Application No. 200780000179.9 (May 27, 2010).

$3^{rd}$ Office Action in corresponding Chinese Application No. 200780000179.9 (Jun. 30, 2011).

Office Action in corresponding Japanese Application No. 2008-554583 (Nov. 9, 2010).

Cited Non-Patent Literature Reference in corresponding Japanese Application No. 2008-554583 (Nov. 2, 2010).

Hattori, "Textbook on wireless broadband," Jun. 10, 2002, p. 216 and p. 220, First Edition, IDG Japan, Inc., Tokyo, Japan.

Imura et al., "The Streaming Technology and the Standardization Activity on the $3^{rd}$ Generation Mobile Communication Network," Technical Report of the Institute of Electronics, Information and Communication Engineers, Jul. 11, 2001, oo. 99-104, vol. 101, No. 194, The Institute of Electronics, Information and communication Engineers, Tokyo, Japan.

Schulzrinne et al., Real Time Streaming Protocol (RTSP) (RFC 2326), Apr. 1998, Network Working Group, Fremont, California.

"Article on Electronic Science and Technology," (Dec. 2005).

"Telecommunication and Internet Converged Services and Protocols for Advanced Networking (TISPAN); Requirements for Network Capabilities to Support IPTV Services (Draft)," Mar. 2006, Version 0.0.1, ETSI, France.

$2^{nd}$ Office Action in corresponding Chinese Application No. 200610033768.4 (Oct. 9, 2011).

Communication in corresponding European Application No. 07720252.1 (Jan. 4, 2012).

Reasons for Refusal in corresponding Japanese Application No. 2008-554583 (Apr. 12, 2011).

SATO, "Realization of QoS control in SIP-adapted NGN," Technical Research Report of the Institute of Electronics Information, and Communication Engineers, Nov. 10, 2005, pp. 55-60, vol. 105, No. 410, The Institute of Electronics, Information, and Communication Engineers, Tokyo, Japan.

SATO, "Implementation of SIP adaptation function for QoS negotiation in NGN," Information Technology R&D Center, Nov. 2005, Mitsubishi Electric Corp., Kanangwa, Japan.

* cited by examiner

SYSTEM, METHOD AND APPARATUS FOR ESTABLISHING INTERACTIVE MEDIA SESSION BASED ON IP MULTIMEDIA SUBSYSTEM

CROSS-REFERENCE TO RELATED APPLICATIONS

The application is a continuation of U.S. patent application Ser. No. 12/192,985, filed on Aug. 15, 2008, which is a continuation of International Patent Application No. PCT/CN2007/000557, filed on Feb. 15, 2007, which claims priority to Chinese Patent Application No. 200610033768.4, filed on Feb. 18, 2006, all of which are hereby incorporated by reference in their entireties.

FIELD OF THE INVENTION

The present invention relates to a system and a method for establishing a session, and more particularly to a system, a method and an apparatus for establishing an interactive media session based on IP Multimedia Subsystem (IMS).

BACKGROUND OF THE INVENTION

With the development of technologies, people are no longer content with inactively watching a program on a TV or computer, rather, they prefer to control the playing of the program, for example, to skip the advertisement using "fast forward" or repeatedly watch an exciting scene using "rewind". Such kind of media applications that involve interactive control from the users are referred to as interactive media services.

Currently, interactive media services are widely used, such as the content-on-demand application in digital TV which allows the user to arbitrarily control the playing procedure, and e-learning application which allows a student to review a certain part of what the teacher just taught at any time.

In the interactive media service, the user is allowed to perform user interactive control operations such as pause, fast forward, rewind, etc. Currently, these interactive controls are carried out through a Real Time Stream Protocol (RTSP), which defines a message mechanism and data packet for the interactive controls between a media sender and receiver. Generally, the media receiver is a terminal, such as a television, a computer, a mobile phone, a PDA, etc., and the media sender is a data source for storing the media, usually a media server.

For the media sender and receiver to transmit an interactive control signaling, a channel for delivering the signaling, i.e., an RTSP connection, must be established. The connection can be established using either Transport Control Protocol (TCP) or User Datagram Protocol (UDP), and the default port number is 554. Meanwhile, a channel for delivering a media needs to be set up, which is typically a Real-time Transport Protocol (RTP) connection. The RTP connection is generally established through UDP. In a conventional network environment, the media sender and receiver establish the RTSP connection first, and then negotiate the address for RTP connection using a SETUP message over the RTSP connection. When the negotiation on the address is finished, the media receiver notifies through a PLAY message the media sender to start playing the media stream.

IP Multimedia Subsystem (IMS) uses an IP grouping domain as a carrier channel for controlling signaling and media delivery, and uses Session Initiation Protocol (SIP) as a call control signaling, thereby separating service management, session control and carrier access from each other.

The IMS network architecture having above separate feature provides necessary conditions for fast deployment and uniform control of various services, which include not only session services but also media services. In the IMS network environment, uniform service management is realized through an application server. In the media service applications, various specific media applications can be deployed in different media application servers, such as a content-on-demand application server, a radio-television application server, etc. Meanwhile, the uniform service control can be conducted by entity and mechanisms at the session control layer.

In the existing system and method for establishing interactive media session, the terminal establishes an RTSP connection with the media server directly and then negotiates an address for RTP connection using the RTSP connection.

In the Next Generation Network (NGN) environment, the carrier function is independent of the control function, and a media server can be disassembled into a media control entity and a media carrier entity. The RTSP connection is established between the terminal and the media carrier entity. However, when the terminal and the media carrier entity negotiate the address for RTP connection over the RTSP connection, the media control entity cannot control the media carrier entity because the negotiation messages do not go through the media control entity.

SUMMARY OF THE INVENTION

Embodiments of the present invention provide a system, a method and an apparatus for establishing an interactive media session based on IMS, for use in a NGN network where the bearer and controller are required to be separated with each other.

An embodiment of the present invention provides a method for establishing an interactive media session based on an IP Multimedia Subsystem, including:
  receiving, by a media control entity, an interactive service request initiated by a terminal;
  controlling, by the media control entity, a media carrier entity to negotiate an address port for RTSP connection and an address port for RTP connection to communicate with the terminal; and
  establishing an RTSP connection for interactive control and an RTP connection for media stream delivery between the terminal and the media carrier entity.

An embodiment of the present invention provides a method for establishing an interactive media session based on IP Multimedia Subsystem, including:
  receiving, by a MRF, an interactive service request initiating by a terminal;
  negotiating, by the MRF, an address port for RTSP connection and an address port for RTP connection to interact with the terminal;
  establishing an RTSP connection for interactive control based on the address port for RTSP connection between the terminal and a media control entity of the MRF; and
  establishing an RTP connection for media stream delivery based on the address port for RTP connection between the terminal and a media carrier entity of the MRF.

An embodiment of the present invention provides a method for establishing an interactive media session based on IP Multimedia Subsystem, including:
  receiving, by a media control entity, an interactive service request initiated by a terminal via an application server;

negotiating, by the application server, an address port for
RTSP connection to communicate with the terminal and
establishing an RTSP connection with the terminal for
interactive control;
negotiating, under the control of the media control entity,
by a media carrier entity, an address, port for RTP connection to communicate with the terminal; and
establishing an RTP connection for media stream delivery
between the terminal and the media carrier entity.

An embodiment of the present invention provides a method for establishing an interactive media session based on IP Multimedia Subsystem, including:
receiving, by a media control entity, an interactive service
request initiated by a terminal;
negotiating, under the control of the media control entity,
by a media carrier entity, an address port for RTP connection to communicate with the terminal;
establishing an RTP connection for media stream delivery
between the terminal and the media carrier entity;
delivering a SIP message to an AS by the terminal, wherein
the SIP message carries media interactive control information;
acquiring, by the AS from the SIP message, the media
interactive control information and converting the media
interactive control information to an RTSP message; and
interacting, between the AS and a MRF, through RTSP
messages to exert interactive media control between a
user and the MRF.

An embodiment of the present invention provides a method for establishing an interactive media session based on IP Multimedia Subsystem, including:
receiving, by a media control entity, an interactive service
request initiated by a terminal;
negotiating, by a media carrier entity, an address port for
RTP connection to communicate with the terminal under
the control of the media control entity;
establishing an RTP connection for media stream delivery
between the terminal and the media carrier entity;
delivering a SIP message to the media control entity by the
terminal, the SIP message carries media interactive control information;
acquiring, by the media control entity from the SIP message, the media interactive control information and converting the media interactive control information to an
H.248 message; and
controlling, by the media control entity, the media carrier
entity to interact, so as to realize media interactive control through the H.248 message.

An embodiment of the present invention provides a method for establishing an interactive media session based on IP Multimedia Subsystem, including:
receiving, by a media stream server which finally provides
service, an interactive service request initiated by a terminal;
negotiating, under the control of a controller inside the
media stream server, by the media stream server, an
address port for RTP connection to communicate with
the terminal;
establishing an RTP connection for media stream delivery
between the terminal and the media stream server;
providing, by the terminal, media interactive control information through a SIP message extension; sending, by
the IMS network, the SIP message to an MRF; and
converting, by the MRF, the media interactive control
information carried in the SIP message to an RTSP message and exerting media interactive control with a media
server already deployed in the network to realize the
media interactive control between the terminal and the
media stream server which finally provides service.

An embodiment of the present invention provides a system for establishing an interactive media session based on IP Multimedia Subsystem, comprising an application server, a media control entity and a media carrier entity, wherein the media carrier entity is in communication with a terminal, wherein
the terminal is adapted to initiate an interactive service
request and establish a Real Time Stream Protocol
(RTSP) connection and a f (RTP) connection;
the application server is adapted to process the service
request;
the media control entity is adapted to control resource
allocation of the media carrier entity; and
the media carrier entity is adapted to allocate, under the
control of the media control entity, address ports for an
RTSP connection and an RTP connection, and establish
the RTSP connection and the RTP connection with the
terminal.

An embodiment of the present invention provides a system for establishing an interactive media session based on IMS Multimedia Subsystem, comprising: an application server, a media control entity, a media carrier entity, wherein the media carrier entity is in communication with a terminal, wherein
the terminal is adapted to initiate an interactive service
request and establish a Real Time Stream Protocol
(RTSP) connection and a Real-time Transport Protocol
(RTP) connection;
the application server is adapted to process the service
request;
the media control entity is adapted to control resource
allocation of the media carrier entity, and allocate an
address port for RTSP connection to establish an RTSP
connection with the terminal; and
the media carrier entity is adapted to allocate an address
port for RTP connection under the control of the media
control entity and establish an RTP connection with the
terminal.

An embodiment of the present invention provides a media resource control device, including:
a first interactive unit, adapted to receive a request delivered by a terminal, and as a response, according to the
information, carried in the request, about address ports
of the terminal for establishing RTSP and RTP connections, return to the terminal address ports for establishing RTSP and RTP connections with the terminal; and
a control unit, adapted to control a media carrier entity to
allocate address ports for establishing RTSP connection
and RTP connection with the terminal, according to the
request received by the first interactive unit.

An embodiment of the present invention provides a media resource control device, including:
a first interactive unit, adapted to receive a request delivered by a terminal, and as a response, return to the
terminal address ports for establishing connections with
the terminal;
a port allocating unit, adapted to allocate a local address
port for RTSP connection based on the request received
by the first interactive unit; and
a control unit, adapted to control a media carrier entity to
allocate an address port for establishing RTP connection
with the terminal, based on the request received by the
first interactive unit.

An embodiment of the present invention provides a media resource processing device, including:

a port allocating unit, adapted to allocate a local address port for RTSP connection and/or for RTP connection with a terminal under the control of a media control entity;

a delivering unit, for delivering the information about address ports for RTSP and RTP connection to the media control entity.

In embodiments of the present invention, the resource allocation for the RTSP and RTP connection of the media server is performed under the control of the media control entity, thus the media control entity can control and record the resource information, such as the address port, of the media carrier entity. Therefore, the present invention can be applied to the NGN network environment where the carrier and control are required to be separated. Meanwhile, since the RTP media connection is established between the terminal and the media carrier entity, the media delivery efficiency can be ensured.

DETAILED DESCRIPTION OF THE EMBODIMENTS

During establishing an interactive media session in the IMS network environment, it is necessary to obey the principle of separating the control function and the carrier function of the NGN. All the control functions for establishing the interactive media session, such as negotiating the port necessary for establishing the media connection, must be performed at a control layer. The final media connection at a carrier layer is established between the terminal and network carrier entity (e.g. an application server having media content stored thereon).

In the IMS network environment, a media control entity at a control layer corresponds to the Multimedia Resource Function Controller (MRFC) of the IMS network architecture, and a media carrier entity at a carrier layer corresponds to the Multimedia Resource Function Processor (MRFP) of the IMS network architecture. Thereby, in the IMS network environment, when interactive control connection and media connection are established between a terminal and a media server, a signaling related control has to be exerted by the MRFC, and the final media connection is established between the terminal and the MRFP.

Figure 1:
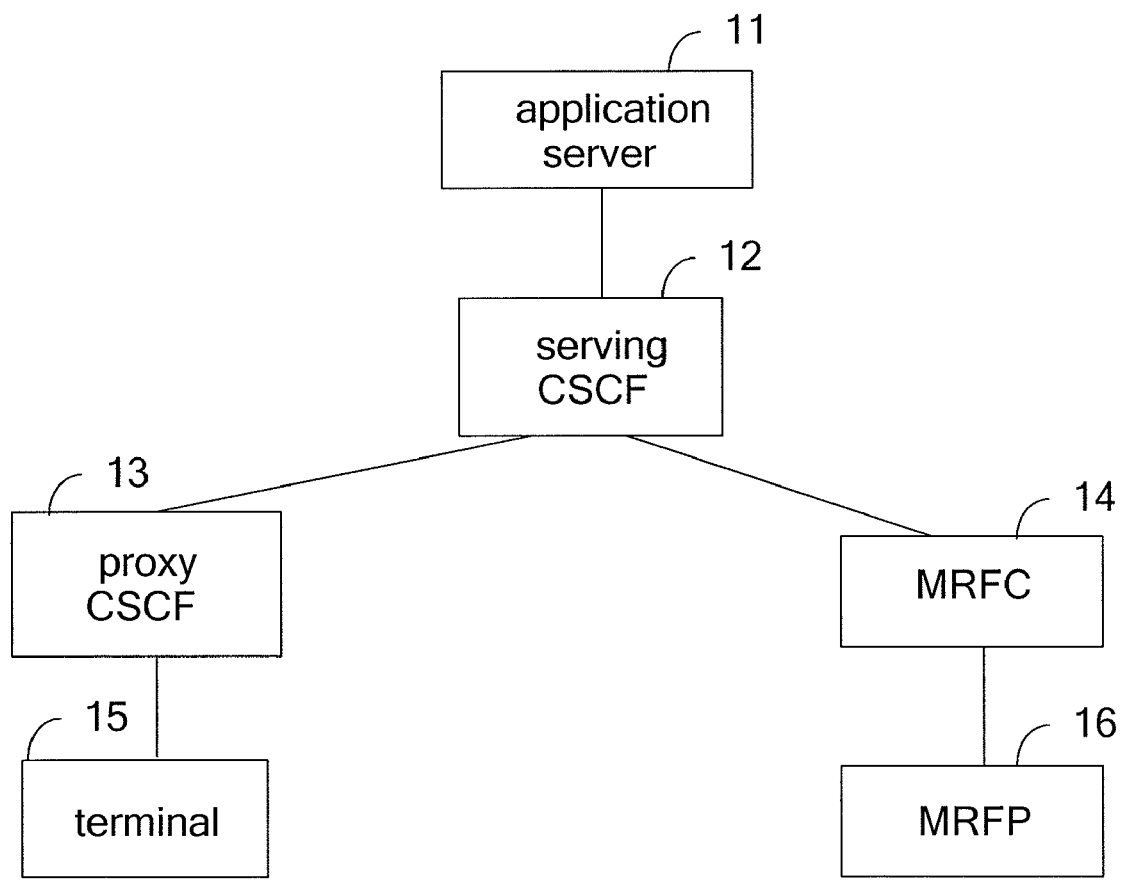
FIG. 1 is a network architecture diagram of the system for establishing interactive media session based on IMS according to an embodiment of the present invention.

As shown in FIG. 1, a system for establishing an interactive media session based on IMS according to the present invention includes a terminal 15, a proxy Call Session Control Function (CSCF) 13, a serving-CSCF 12, an application server 11, MRFC 14 and MRFP 16. The terminal 15 is adapted to initiate an interactive media session request and receive a media session response; the proxy-CSCF 13 is adapted to forward requests and responses between the terminal 15 and the serving-CSCF 12; the serving-CSCF 12 is adapted to route and trigger the request to the application server 11 according to a triggering rule; the application server 11 is adapted to process a media session request; the MRFC 14 is adapted to control the resource allocation of MRFP 16, such as the port number allocation; the MRFP 16 is adapted to allocate resource information such as an address port for RTSP connection and an address port for RTP connection under the control of the MRFC 14, and establish an RTSP connection and an RTP connection.

Further, as required, the MRFC 14 may act as an RTSP proxy, forward the RTSP message between the terminal 15 and the MRFP 16, or perform SIP encapsulation/decapsulation towards an RTSP message.

As required, the MRFP 16 may also perform SIP encapsulation/decapsulation towards an RTSP message.

Further, as required, the application server 11 may receive control messages from a personal VCR (Video Cassette Recorder) or act as an RTSP proxy.

Embodiment 1 of the present invention provides a method for establishing an interactive media session based on IMS as follows.

A1. The terminal initiates an interactive service request to be routed to a MRFC. The interactive service request carries information about address ports for RTSP connection and address ports for RTP connection for media stream delivery.

A2. The MRFC controls the MRFP to interact, and acquires address ports allocated by the MRFP for RTSP connection and RTP connection to the terminal.

A3. The MRFC returns a service request response to the terminal. The service request response carries information about address ports for RTSP connection and RTP connection of the MRFP.

A4. The terminal establishes an RTSP connection for interactive control and an RTP connection for delivering a media stream to the MRFP directly, based on the received information about address ports.

Since the resource allocation of the MRFP for the RTSP connection and RTP connection is controlled by the MRFC, the MRFC can control and record the resource information such as address ports of the MRFP, which complies with the requirement of separating the carrier function and control function in a NGN network environment. Finally, the RTSP connection is established between the terminal and the MRFP, and the user can perform operations such as pause, fast forward, rewind, etc. using the RTSP connection.

In the RTSP, the terminal first negotiates the address port for RTP connection with the application server using a SETUP message, then it starts to play media stream using a PLAY message. In the RTSP state machine, if the terminal plays the media stream directly using the PLAY message without interaction through a SETUP message, the application server declines the request. In the above method according to embodiment 1 of the present invention, since the RTSP connection and RTP connection are negotiated in the same request, the terminal can play the program directly using the PLAY message, without negotiating the RTP connection information using the SETUP message in advance. Thus, the RTSP has to be adjusted appropriately in the above method according to embodiment 1 of the present invention, for example, the terminal and application server no longer negotiate the parameter information for the RTP connection in the SETUP message; or the terminal is allowed to inform the application server to play the program directly using the PLAY message, without delivering the SETUP message.

In the above method according to embodiment 1, the RTSP and RTP parameter information for the interactive service request and response can be carried by the Session Description Protocol (SDP), and the SDP can be carried by the SIP.

Figure 2:
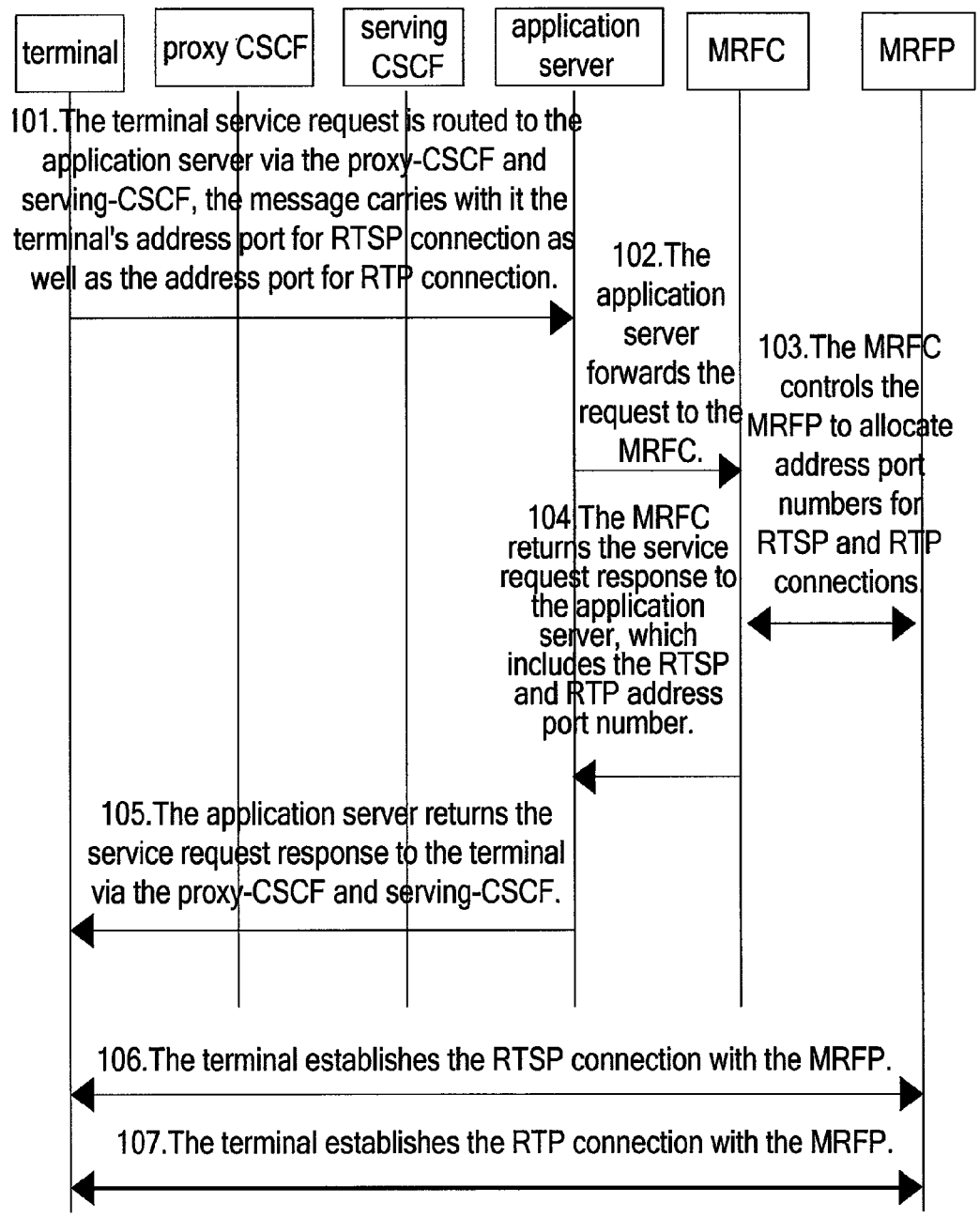
FIG. 2 is a flow chart of establishing interactive media session based on IMS according to embodiment 1 of the present invention.

As shown in FIG. 2, a procedure for establishing an interactive media session based on IMS according to embodiment 1 of the present invention is as follows:

101. The terminal initiates an interactive service request to be routed to an application server via a proxy-CSCF and a serving-CSCF. The interactive service request also carries information about address ports for RTSP connection and address port for RTP connection for media stream delivery, of the terminal. The information may be carried by a SDP message;

102. The application server forwards the interactive service request to the MRFC;

103. The MRFC controls the MRFP to interact, and acquires information about address ports allocated by the MRFP for establishing RTSP connection and RTP connection with the terminal. The MRFP returns the information about address ports to the MRFC after allocation. With the interaction, MRFC acquires information about address ports for RTSP connection and address ports for RTP connection of the MRFP. The interactive protocol can be the H.248 protocol or a combination of the SIP and the eXtensible Markup Language (XML).

104. The MRFC returns a service request response to the application server. Information about address ports for establishing RTSP connection and RTP connection of the MRFP are included in the service request response.

105. The application server returns the service request response to the terminal via the proxy-CSCF and a serving-CSCF.

106. The terminal establishes the RTSP connection with the MRFP for interactive control such as fast forward, rewind, and pause, based on the information about address ports for establishing RTSP connection of the MRFP carried in the service request response.

107. The terminal establishes the RTP connection with the MRFP for media stream delivery, based on the information about address ports for establishing RTP connection of the MRFP carried in the service request response.

In the above embodiment, the terminal negotiates at the same time the address ports for establishing RTSP connection and RTP connection with the MRFP during interaction of the service request through the IMS system. Then, the terminal establishes the RTSP and RTP connections directly with the MRFP for interactive control and media stream delivery respectively.

A method for establishing the interactive media session based on IMS according to embodiment 2 of the present invention is described below.

B1. A terminal initiates an interactive service request to be routed to a MRFC. The interactive service request carries information about address port for RTSP connection of the terminal.

B2. The MRFC controls a MRFP to interact, and acquires an address port allocated by the MRFP for RTSP connection with the terminal.

B3. The MRFC returns a service request response to the terminal. The service request response carries information about address ports for RTSP connection of the MRFP.

B4. The terminal establishes an RTSP connection for interactive control with the MRFP based on the received information about address ports for RTSP connection.

B5. The terminal sends a SETUP message to the MRFP over the RTSP connection, and the SETUP message carries information about address ports for establishing RTP connection to deliver a media stream;

B6. After receiving the SETUP message, the MRFP allocates a local address port for RTP connection and reports the local address port to the MRFC;

B7. The MRFP returns a SETUP message response to the terminal, and the SETUP response carries information about the address port for RTP connection of the MRFP;

B8. The terminal establishes an RTP connection for delivering the media stream to the MRFP based on the received information about the address port for RTP connection.

Figure 3:
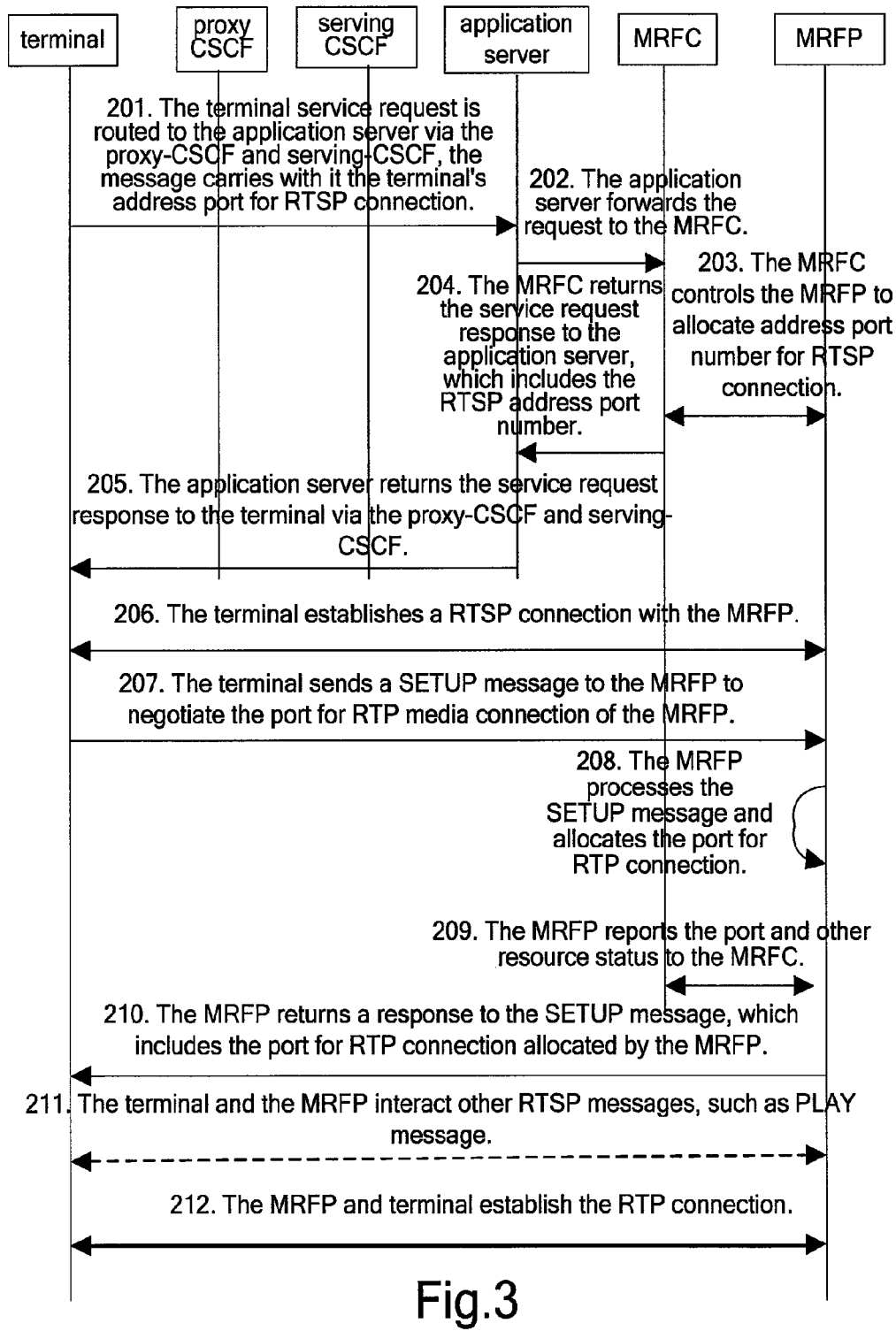
FIG. 3 is a flow chart of establishing interactive media session based on IMS according to embodiment 2 of the present invention.

As shown in FIG. 3, a procedure for establishing the interactive media session based on IMS according to embodiment 2 of the present invention is as follows.

201. A terminal initiates an interactive service request to be routed to an application server via a proxy-CSCF and a serving-CSCF. The interactive service request also carries information about address ports for RTSP connection of the terminal. The information about address ports may be carried by a SDP message, and the SDP message may be carried by a SIP message;

202. The application server forwards the interactive service request to a MRFC;

203. The MRFC controls a MRFP to interact and acquires information about address ports allocated by the MRFP for establishing RTSP connection with the terminal. The MRFP returns information about the allocated address ports to the MRFC after allocation. With the interaction, MRFC acquires the address ports for RTSP connection of the MRFP. The used interactive protocol may be the H.248 protocol or a combination of the SIP and the XML;

204. The MRFC returns a service request response to the application server. The information about address ports for RTSP connection of the MRFP is included in the service request response.

205. The application server returns the service request response to the terminal via the proxy-CSCF and the serving-CSCF.

206. The terminal establishes an RTSP connection with the MRFP. Since the address port received by the terminal is the address port of the MRFP, the RTSP connection is established between the terminal and the MRFP;

207. After establishing the RTSP connection, the terminal sends a SETUP message to the MRFP over the RTSP connection, the SETUP message carries information about the address port for RTP media connection of the terminal;

208 After receiving the SETUP message, the MRFP allocates a local address port for RTP connection;

209. After finish allocating the local RTP port, the MRFP reports its own resource status to the MRFC, including the allocation of ports. The used interactive protocol may be the H.248 protocol or a combination of the SIP and the XML;

210. The MRFP returns a response to the SETUP message, which includes information about the address port allocated by the MRFP for RTP connection;

211. The terminal interacts with the MRFP to communicate other RTSP messages, such as PLAY messages;

212. The MRFP and terminal establish the RTP connection.

In the above embodiment, the terminal and MRFP negotiate the address port for RTSP connection first, and then the address port for RTP connection is negotiated over the RTSP connection; the MRFP reports the status of ports and other resource to the MRFC.

It shall be noted that in the above step 206, whether the RTSP message goes through AS depends on whether the AS modifies the address port for RTSP, which is similar to the MRFC's operation in embodiment 1.

A method for establishing an interactive media session based on IMS according to embodiment 3 of the present invention is described below.

C1. A terminal initiates an interactive service request to be routed to a MRFC. The interactive service request carries information about address ports for RTSP connection of the terminal;

C2. The MRFC controls a MRFP to interact and acquires information about address ports allocated by the MRFP for RTSP connection with the terminal;

C3. The MRFC returns a service request response to the terminal. The service request response carries information about address ports for RTSP connection of the MRFP. The MRFC allocates a local port for RTSP connection and returns the local port to the terminal. The MRFC stores the association between the locally allocated RTSP port and the RTSP port allocated by the MRFP, for the sake of forwarding messages in the future;

C4. The terminal establishes an RTSP connection with the MRFC based on information about address ports for RTSP connection in the service request response;

C5. After establishing the RTSP connection, the terminal sends a SETUP message to the MRFC over the RTSP connection, the SETUP message carries information about address ports for RTP connection, where the RTP connection is used for media stream delivery;

C6. The MRFC determines whether the MRFP is allowed to continue service operations according to the MRFP's resource status. If it is allowed, the MRFC forwards the SETUP message to the MRFP based on the association stored in step C3;

C7. After receiving the SETUP message, the MRFP allocates a local address port for RTP connection and returns the local port to the MRFC;

C8. The MRFC returns a SETUP message response to the terminal. The returned response includes information about address ports allocated by the MRFP for RTP connection;

C9. Based on the received information about address ports for RTP connection, the terminal establishes an RTP connection for media stream delivery between the terminal and the MRFP.

In the above embodiment, the MRFC acts as an RTSP proxy and maps the address port allocated by the MRFP for RTSP connection in the service request response into its own address port. Thus, when the terminal receives the service request response, since the address port in the response is the address port of the MRFC, the RTSP connection to the MRFC is established, and thus the SETUP message over the RTSP connection delivered by the terminal passes through the MRFC, thereby the MRFC can control the allocation of the port resources of the MRFP. The MRFC does not convert information about the address port for RTP connection in the SETUP response message, so the address port contained in the SETUP response message received by the terminal is the address port of the MRFP. Thus, the media connection is established directly between the terminal and the MRP after the RTSP message is forwarded by the MRFC.

Figure 4:
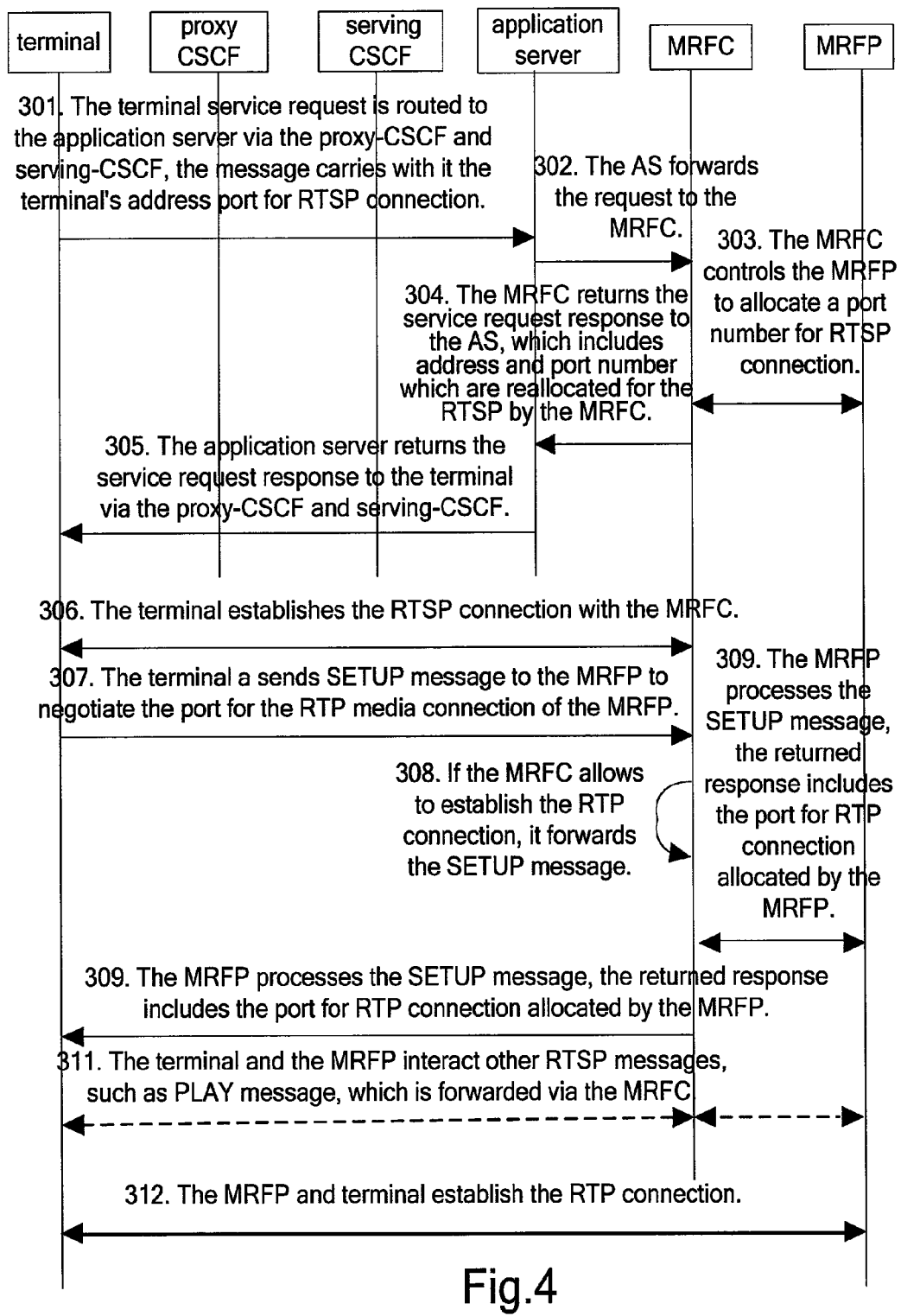
FIG. 4 is a flow chart of establishing interactive media session based on IMS according to embodiment 3 of the present invention.

As shown in FIG. 4, a procedure for establishing an interactive media session based on IMS according to embodiment 3 of the present invention is as follows:

301. A terminal initiates an interactive service request to be routed to an application server via a proxy-CSCF and a serving-CSCF. The interactive service request carries information about address ports for RTSP connection of the terminal, where the information may be carried by a SDP message, and the SDP message may be carried by a SIP message;

302. The application server forwards the interactive service request to a MRFC;

303. The MRFC controls a MRFP to interact and acquires an address port allocated by the MRFP for RTSP connection with the terminal. The MRFP returns information about address ports to the MRFC after allocation. With the interaction, the MRFC acquires information about address ports of the MRFP for RTSP connection. The interactive protocol used can be the H.248 protocol or a combination of the SIP and the XML;

304. The MRFC returns a service request response to the application server. Information about address ports of the MRFC for the RTSP connection is included in the service request response. The MRFC acts as an RTSP proxy and allocates a local port for RTSP connection and returns the local port to the terminal. The MRFC stores the association between the locally allocated RTSP port and the RTSP port allocated by the MRFP, for the sake of forwarding messages in the future;

305. The application server returns a service request response to the terminal via the proxy-CSCF and the serving-CSCF;

306. The terminal establishes an RTSP connection with the MRFC, based on information about the address port for RTSP connection in the service request response;

307. After establishing the RTSP connection, the terminal sends a SETUP message to the MRFC over the RTSP connection, the SETUP message carries information about the address port for RTP media connection of the terminal;

308. The MRFC determines whether the MRFP is allowed to continue a service operation according to the resource status of the MRFP. If it is allowed, the MRFC forwards the SETUP message to the MRFP based on the association stored in step 304;

309. After receiving the SETUP message, the MRFP allocates a local address port for RTP connection and returns the local address port to the MRFC;

310. The MRFC returns a response to the SETUP message to the terminal. The returned response includes information about the address port allocated by the MRFP for RTP connection;

311. The terminal interacts with the MRFP for communicating other RTSP messages, such as PLAY messages, which are routed via the MRFC;

312. The MRFP and the terminal establish an RTP connection.

In the above embodiment, by functioning as a proxy, the MRFC forwards the RTSP message between the terminal and the MRFP. In the embodiment, the RTSP message between the terminal and the MRFP is forwarded via the MRFC, and thus the MRFC can control and acquire the address port allocated by the MRFP for RTP connection.

Those skilled in the art shall understand that, the way that the MRFC functions as a proxy for the RTSP connection to forward RTSP messages between the terminal and the MRFP is also applicable to other embodiments of the present invention, such as embodiment 1.

Furthermore, the MRFC can also terminate the RTSP connection and convert the control information in an RTSP message into other protocol messages, such as an H.248 message or a SIP message, so as to control the MRFP to exert interactive user control. As those skilled in the art shall understand, it is not necessary for the MRFP to involve in negotiating the RTSP connection parameters in such embodiments.

Similarly, the above implementing modes can also be applied to other embodiments of the present invention, such as embodiment 1.

A method for establishing an interactive media session based on IMS according to embodiment 4 of the present invention comprises:

D1. A terminal initiates an interactive service request to be routed to a MRFC. The interactive service request carries information about an address port for RTSP connection of the terminal;

D2. The MRFC controls a MRFP to interact and acquires information about an address port allocated by the MRFP for RTSP connection with the terminal;

D3. The MRFC returns a service request response to the terminal. The service request response carries information about the address port for RTSP connection of the MRFP. When returning the service request response, the MRFC adds itself to the record-route field in the SIP header field;

D4. The terminal establishes an RTSP connection with the MRFP based on information about the address port for RTSP connection contained in the service request response. The messages for the establishment of RTSP connection are encapsulated through SIP messages;

D5. After having established the RTSP connection, the terminal negotiates with the MRFP address ports for RTP connection by using a SETUP message over the RTSP connection, the SETUP message is forwarded to the MRFC;

D6. If the MRFC allows the terminal and the MRFP to establish an RTP connection, it forwards the SETUP message to the MRFP;

D7. The MRFP processes the SETUP message and returns a response to the SETUP message to the terminal via the MRFC. The response includes information about an address port allocated by the MRFP for RTP connection. The MRFC records information about the address port;

D8. Based on the received about the address port, the terminal establishes an RTP connection with the MRFP for media stream delivery.

In the above embodiment, since all the RTSP messages go through the MRFC, the MRFC is capable of acquiring the SETUP message delivered by the terminal, thus controlling the MRFP to allocate the address port for RTP connection. The RTP media connection is also directly established between the terminal and the MRFP.

In the above embodiment, the RTSP messages can also be realized by adopting corresponding SIP messages, through extension of the SIP protocol. In this way, the previously mentioned encapsulating/decapsulating steps no longer involve.

Figure 5:
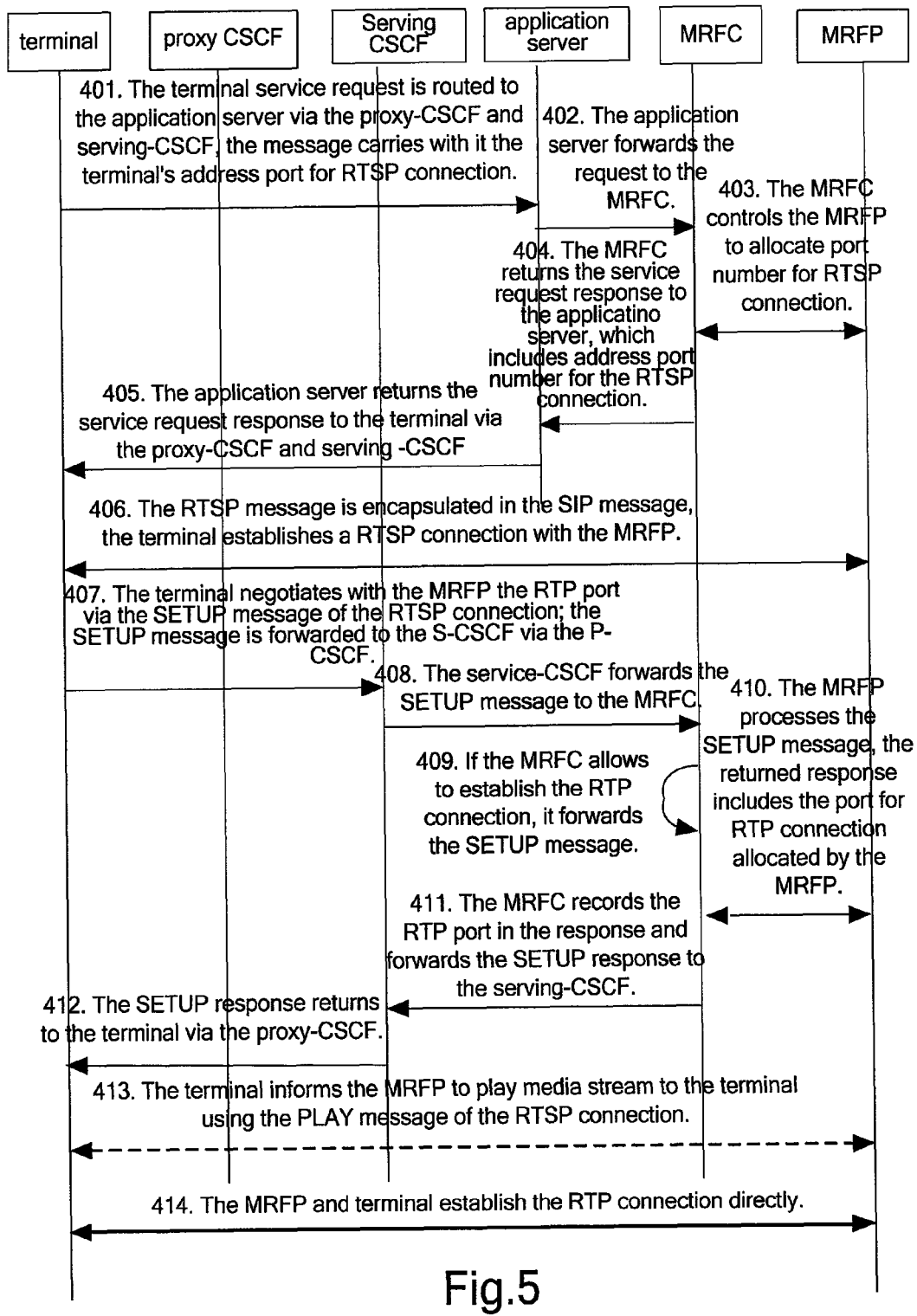
FIG. 5 is a flow chart of establishing interactive media session based on IMS according to embodiment 4 of the present invention.

As shown in FIG. 5, a procedure for establishing an interactive media session based on IMS according to the fourth embodiment of the present invention is as follows:

401. The terminal initiates an interactive service request to be routed to the application server via a proxy-CSCF and a serving-CSCF. The interactive service request carries information about an address port for RTSP connection of the terminal. The information may be carried by a SDP message, and the SDP message may be carried by a SIP message;

402. The application server forwards the interactive service request to the MRFC;

403. The MRFC controls a MRFP to interact and acquires information about an address port allocated by the MRFP for RTSP connection with the terminal. The MRFP returns the information to the MRFC after allocation. With the interaction, the MRFC acquires information about an address port for RTSP connection of the MRFP. The interactive protocol can be the H.248 protocol or a combination of the SIP and the XML;

404. The MRFC returns a service request response to the application server. Information about the address port for RTSP connection of the MRFC is included in the service request response. When returning the service request response, the MRFC adds itself to the record-route filed in the SIP header field, to ensure that the RTSP message to be subsequently encapsulated in a SIP message goes through the MRFC;

405. The application server returns the service request response to the terminal via a proxy-CSCF and a serving-CSCF, the terminal records the routing information in the message header, the proxy-CSCF, the serving-CSCF and the MRFC are included in the routing information;

406. The terminal establishes an RTSP connection with the MRFP, based on information about an address port for RTSP connection in the service request response; The messages for the establishment of RTSP connection are encapsulated through SIP messages;

407. After establishing the RTSP connection, the terminal negotiates with the MRFP address ports for RTP connection via the SETUP message over the RTSP connection; the SETUP message is forwarded to the S-CSCF via the P-CSCF;

408. The serving-CSCF forwards the SETUP message to the MRFC;

409. If the MRFC allows the terminal and the MRFP to establish an RTP connection, it forwards the SETUP message to the MRFP;

410. The MRFP processes the SETUP message to return a response including information about the address port allocated by the MRFP for RTP connection.

411. The MRFC records the information about the address port for RTP connection in the response and forwards the SETUP response to the serving-CSCF;

412. The SETUP response is returned to the terminal via the proxy-CSCF;

413. The terminal notifies the MRFP to play a media stream using a PLAY message over the RTSP connection;

414. The MRFP and terminal establish the RTP connection directly.

In the above embodiment, the terminal and the MRFP negotiate address ports for RTSP connection first, and then they negotiate address ports for RTP connection through the RTSP connection. By encapsulating the RTSP message into a SIP message, the RTSP message goes through the MRFC, and thereby the MRFC can control the MRFP to allocate the address port for RTP connection.

To ensure that the subsequent RTSP messages go through the IMS system, when negotiating the address port for RTSP connection, the MRFC adds itself to the record-route header field. The terminal encapsulates the subsequent RTSP message into the SIP message for delivery. After negotiating the address port for RTP connection by using the RTSP message, the RTP connection is established between the terminal and the MRFP directly.

In the above embodiment, the terminal/MRFP performs a SIP encapsulation towards the RTSP message, and the MRFP/terminal performs a SIP decapsulation on the RTSP message. In practice, the encapsulation/decapsulation may also be performed by the MRFC. In that case, the SIP message terminates in the MRFC. Then, the MRFC can establish an RTSP connection with the MRFP, or convert the control information contained in the decapsulated RTSP message to other protocol messages, such as an H.248 message, thereby controlling the MRFP to realize interactive user control.

Furthermore, in the above embodiments of the present invention, AS can also function as a proxy for the RTSP connection. In other words, after acquiring the information about address ports for RTSP connection of the MRFP, the AS allocates a local port for RTSP connection. The AS stores an association between the locally allocated RTSP port and the RTSP port allocated by the MRFP, and returns a service request response to the terminal which carries the information about the address port allocated by the AS for RTSP connection, for the sake of forwarding messages in the future. Further, other RTSP messages interacted between the terminal and the MRFP, such as a PLAY message, are forwarded via the AS; the RTP connection is established between the terminal and the MRFP.

Furthermore, the AS can also terminate the RTSP connection and convert the interactive media control information in the RTSP message into other protocol messages, such as a SIP message, and then send the converted message to the MRFC, thereby controlling the MRFP to realize interactive user control.

Furthermore, the terminal can perform a SIP encapsulation/decapsulation on the RTSP message; accordingly, the SIP encapsulation/decapsulation can be performed by the AS. In that case the SIP message terminates at the AS. Then, the AS establishes an RTSP connection with the MRFC, or converts the control information in the decapsulated RTSP message to other protocol messages, such as a SIP message, and sends the converted message to the MRFC, thereby controlling the MRFP to realize interactive user control. The connection between the MRFC and MRFP may also be an RTSP connection, or is realized by an H.248 message or a SIP message.

In a practical network deployment, the AS and MRFC can be deployed in the same network, thus the interface between the AS and MRFC is an internal interface. In this case, the service quest response carries the information about the RTSP address port of the AS or MRFC to the terminal, so as to enable the AS (or MRFC) receive the RTSP message. The protocol used between the AS (or MRFC) and MRFP is the RTSP, the H.248 protocol or the SIP, which converts the interactive media control information in the received RTSP message into a corresponding protocol message to exert control on the MRFP, thereby realizing the interactive media control between the user terminal and a media server.

The interactive media session generally includes an RTSP interactive control channel and an RTP media channel. According to embodiments of the present invention, the RTSP interactive control channel is established at a control layer of the network, thereby ensuring good control over a network carrier entity by a network control entity, which conforms to the concept of separating the carrier function and the control function in the NGN. Meanwhile, the media connection is established between the terminal and the MRFP, ensuring the media delivery efficiency.

In embodiments of the present invention, under the control of the MRFC, the MRFP negotiates the address port for RTP connection to communicate with the terminal, and establishes the RTP connection with the terminal.

On the above basis, interactive media control information can be transported between the terminal and the AS based on a SIP message. The AS acquires the interactive media control information from the SIP message and converts it to an RTSP message to interact with the media server, thus realizing the interactive media control between the user terminal and the media server. The method of such embodiments applies to the scenario where the terminal does not support RTSP.

Similarly, a SIP message can be used to communicate interactive media control information between the terminal and the MRFC, and the MRFC acquires the interactive media control information from the SIP message and converts it to other messages, such as an H.248 message, to exert interactive media control over the MRFP, thus realizing the interactive media control between the terminal and the MRFP. The method of such embodiments applies to the scenario where neither the terminal nor the network supports RTSP. The media stream content is provided by the MRF in the IMS network, and the MRFC and MRFP interact with each other using the H.248 protocol.

Furthermore, for the scenario where the terminal does not support RTSP and the media stream content is provided by other media server (such as the previously deployed media stream server which supports the RTSP), the terminal can carry the media interactive control information by extending the SIP message. The IMS network routes the SIP message to the MRF, and the MRF converts the interactive media control information in the SIP message to an RTSP message so as to exert media control over the interaction with other media server already deployed in the network. Thereby the media interactive control between the terminal and the final media stream server which provides the service is realized. In the above procedure, the RTP connection is established between the terminal and the final media server.

Alternatively, the MRFC may support the RTSP to realize the RTSP interaction. When a SIP message is used to transfer the interactive media control information between the terminal and the MRFC, the MRFC acquires the interactive media control information from the SIP message and converts the interactive media control information to an RTSP message, to interact with other media server. Therefore, the interactive media control between the terminal and the media stream server which provides the service is realized. Here, the MRFC performs the conversion of the media interactive information between the SIP message and the RTSP message.

Alternatively, the MRFP may support the RTSP to realize the RTSP interaction. A SIP message is used to transfer the interactive media control information between the terminal and the MRFC. The MRFC acquires the interactive media control information from the SIP message and converts it to an H.248 message to control the MRFP. Under the control of the MRFC, the MRFP converts the interactive media control information to an RTSP message, so as to interact with other media server, thus realizing the interactive media control between the terminal and final the media stream server which provides the service. Here, the MRFP performs the conversion of media interactive information between the H.248 message and the RTSP message.

Figure 6:
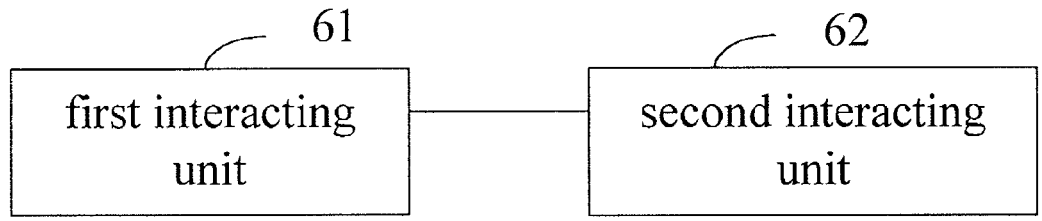
FIG. 6 is a schematic diagram of a media resource control device according to embodiment 1 of the present invention.

With reference to FIG. 6, an embodiment of the present invention, provides a media resource control device, comprising: a first interactive unit 61 for receiving a request delivered by a terminal, and as a response, returning to the terminal addresses ports for establishing RTSP and RTP connections with the terminal, according to the address ports carried in the request for the terminal to establish RTSP and RTP connections; a control unit 62, for controlling the MRFP to allocate address ports for establishing an RTSP connection and an RTP connection with the terminal, according to the request received by the first interactive unit 61.

In a specific implementation, the request may be an interactive service request, which carries address ports of the terminal for establishing the RTSP and RTP connections. The addresses ports allocated by the MRFP for establishing connections with the terminal include address ports for RTSP and RTP connections.

In another specific implementation, the request includes the interactive service request delivered by the terminal before establishing the RTSP connection and the SETUP message delivered over the established RTSP connection. The address port of the terminal for establishing the RTSP connection is carried in the interactive service request, and the address port of the terminal for establishing the RTP connection is carried in the SETUP message, where the SETUP message is delivered over the established RTSP connection.

In the above embodiment, the media resource control device is mainly adapted to control the MRFP to allocate the address ports for the RTSP or RTP connection.

The media resource control device provided by embodiment 2 can further act as a proxy to forward the RTSP message between the terminal and the MRFP.

Figure 7:
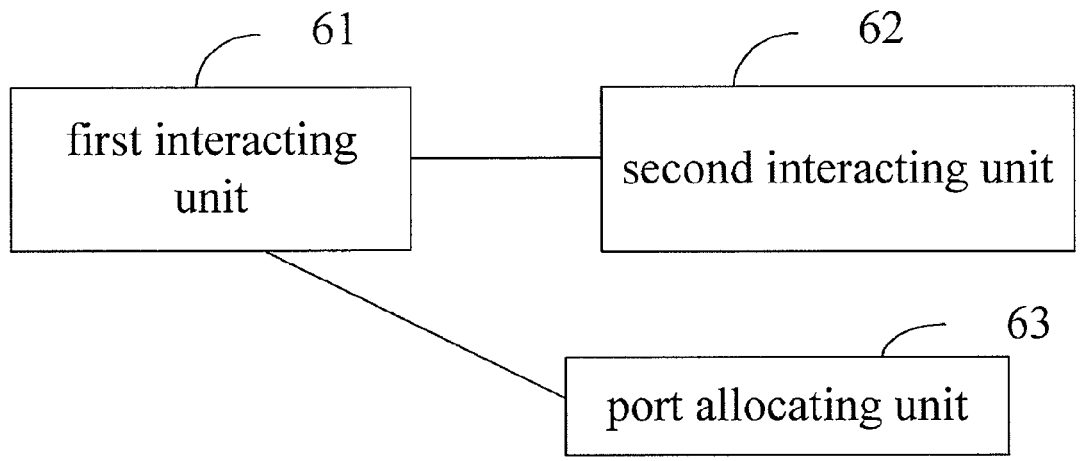
FIG. 7 is a schematic diagram of a media resource control device according to embodiment 2 of the present invention.

As shown in FIG. 7, the media resource control device according to embodiment 2 of the present invention comprises:
 a first interaction unit 61, adapted to receive a request delivered by a terminal, and return to the terminal address ports for establishing connections with the terminal, as a response;
 a port allocation unit 63, adapted to allocate a local address port for RTSP connection, based on the request received by the first interactive unit 61;
 a second control unit 62, adapted to control a MRFP to allocate an address port for establishing an RTP connection with the terminal, based on the request received by the first interaction unit 61.

In a specific implementation, the request can be an interactive service request, which carries the address ports of the terminal for establishing the RTSP and RTP connections. The address ports allocated by the MRFP for establishing the connections with the terminal include the address ports for RTSP and RTP connections.

In another specific implementation, the request includes the interactive service request delivered by the terminal before establishing the RTSP connection and the SETUP message delivered over the established RTSP connection. The address port of the terminal for establishing the RTSP connection is carried in the interactive service request, and the address port of the terminal for establishing the RTP connection is carried in the SETUP message, where the SETUP message is delivered over the established RTSP connection.

The media resource control device according to embodiments of the present invention may be a MRFC or a function entity independent of the MRFC.

Figure 8:
FIG. 8 is a schematic diagram of a media resource processing device according to an embodiment of the present invention.

With reference to FIG. 8, an embodiment of the present invention further provides a media resource processing device, comprising: a port allocating unit 81, adapted to allocate, under the control of a MRFC, local address ports for RTSP and/or RTP connections with the terminal; a delivering unit 82, adapted to deliver information about the address ports for RTSP and RTP connections to the MRFC.

In a specific implementation, the local address ports allocated by the port allocating unit 81 include an address port for RTSP connection and an address port for RTP connection. The address ports delivered to the MRFC by the delivering unit 82 include an address port for RTSP connection and an address port for RTP connection.

In another specific implementation, the local address port allocated by the port allocating unit 81 is the RTP address port. The delivering unit 82 sends information about the address port for RTP connection to the MRFC via the SETUP response message.

In another specific implementation, the local addresses ports allocated by the port allocating unit 81 include an address port for RTSP connection and an address for RTP connection. The address ports delivered to the MRFC by the delivering unit 82 include an address port for RTSP connection and an address port for RTP connection delivered to the MRFC through a response to the SETUP message.

A media resource processing device, according to an embodiment of the present invention, reports to the MRFC the allocated address ports for the RTSP and RTP connection. When combined with the media resource control device according to embodiments of the present invention, the media resource processing device can establish an RTSP interactive control channel at a control layer of the network, thereby ensuring the control of the network control entity over the network carrier entity, which complies with the requirement of separating the carrier function and the control function in the NGN network. Meanwhile, the media connection is established between the terminal and the MRFP to ensure the media delivery efficiency.

The media resource processing device according to embodiments of the present invention may be a MRFC or a function entity independent of the MRFC.

It should be noted that in embodiments of the present invention, all and part of functions of the MRFC can be realized by a functional entity independent of the MRFC, such a functional entity and the MRFC can be referred to as media control entity collectively. Similarly, all and part of functions of the MRFP can be realized by a functional entity independent of the MRFP, such a functional entity and the MRFP can be referred to as media carrier entity collectively Furthermore, the MRFC and MRFP can be combined and referred to as MRF. All and part of functions of the MRF can be realized by a functional entity independent of the MRF, such a functional entity and the MRF can be referred to as media server collectively. Those skilled in the art shall understand that the MRF, MRFC and MRFP may correspond to the media server, the control part of the media server and the processing part of the media server respectively.

What is claimed is:

1. A method for establishing an interactive media session based on an IP Multimedia Subsystem (IMS) network, comprising:
 receiving, by a media control entity in the IMS network, an interactive service request initiated by a terminal, wherein the interactive service request carries a first address port for an RTSP connection and a first address port for an RTP connection;
 controlling, by the media control entity, a media carrier entity in the IMS network to negotiate a second address port for the RTSP connection and a second address port for the RTP connection to communicate with the terminal; and
 establishing another RTSP connection for interactive control based on the first address port for the RTSP connection and the second address port for the RTSP connection between the terminal and the media carrier entity, and establishing another RTP connection for media stream delivery based on the first address port for the RTP connection and the second address port for the RTP connection between the terminal and the media carrier entity.

2. The method of claim 1, wherein
the controlling, by the media control entity, the media carrier entity to negotiate the second address port for RTSP connection and the second address port for the RTP connection to communicate with the terminal further comprises:
controlling, by the media control entity, the media carrier entity to interact, and acquiring the second address port which is allocated by the media carrier entity for the RTSP connection and the second address port which is allocated by the media carrier entity for the RTP connection; and
returning, by the media control entity, a service request response to the terminal, wherein the service request response carries the second address address port for the RTSP connection and the second port for the RTP connection.

3. The method of claim 1, wherein
the controlling, by the media control entity, a media carrier entity to negotiate the second address port for the RTSP connection and the second address port for the RTP connection to communicate with the terminal comprises:
negotiating, by the media carrier entity, the second address port for the RTSP connection to interact with the terminal, before establishing the RTSP connection for the interactive control between the terminal and the media carrier entity; and
negotiating, by the media carrier entity, the second address port for the RTP connection to interact with the terminal, after establishing the RTSP connection for the interactive control and before establishing the RTP connection for media stream delivery between the terminal and the media carrier entity.

4. The method of claim 3, wherein the negotiating the second address port for the RTSP connection to interact with the terminal comprises:
controlling, by the media control entity, the media carrier entity to interact, and acquiring the second address port allocated by the media carrier entity for the RTSP connection with the terminal; and
returning, by the media control entity, a service request response to the terminal, wherein the service request response carries information about the second address port for the RTSP connection.

5. The method of claim 3, wherein the negotiating the second address port for the RTP connection to interact with the terminal further comprises:
sending, by the terminal, a SETUP message to the media carrier entity over the RTSP connection, wherein the SETUP message carries information about the first address port for RTP connection of the terminal for media stream delivery;
allocating, by the media carrier entity, a local address port for the RTP connection and reporting the local address port for the RTP connection to the media control entity, after receiving the SETUP message; and
returning, by the media carrier entity, a response to the SETUP message to the terminal, wherein the response carries information about the local address port for the RTP connection of the media carrier entity.

6. The method of claim 3, wherein the negotiating the second address port for the RTSP connection to interact with the terminal further comprises:
controlling, by the media control entity, the media carrier entity to interact, and acquiring the second address port allocated by the media carrier entity for the RTSP connection with the terminal;
returning, by the media control entity, a service request response to the terminal, wherein the service request response carries information about the second address port for RTSP connection, and routing information of the service request response includes the media control entity.

7. A method for establishing an interactive media session based on IP Multimedia Subsystem (IMS) network, comprising:
receiving, by a Multimedia Resource Function (MRF) in the IMS network, an interactive service request initiated by a terminal;
negotiating, by the MRF, a first address port for an RTSP connection and a first address port for an RTP connection to interact with the terminal;
establishing another RTSP connection for interactive control based on the first address port for the RTSP connection between the terminal and a media control entity of the MRF; and
establishing another RTP connection for media stream delivery based on the first address port for the RTP connection between the terminal and a media carrier entity of the MRF.

8. The method of claim 7, wherein the method further comprises:
forwarding, by the media control entity, an RTSP message from the terminal to the media carrier entity, or converting an RTSP message from the terminal to an H.248 message or a SIP message, and then delivering the H.248 message or the SIP message to the media carrier entity.

9. The method of claim 7, wherein the method further comprises: decapsulating by the media control entity, a SIP message from the terminal which encapsulates an RTSP message, and forwarding the RTSP message to the media carrier entity, or converting the RTSP message to an H.248 message or a SIP message and then delivering the converted message to the media carrier entity.

10. The method of claim 7, wherein, the interactive service request carries information about a second address port for the RTSP connection of the terminal; and
the negotiating by the MRF a first address port for the RTSP connection and a first address port for the RTP connection to communicate with the terminal comprises:
negotiating, by the MRF, the first address port for the RTSP connection to communicate with the terminal, before establishing the RTSP connection for the interactive control between the terminal and the media control entity; and
negotiating, by the media carrier entity, under the control of the media control entity, the first address port for the RTP connection to communicate with the terminal after establishing the RTSP connection for the interactive control between the terminal and the media control entity and before establishing the RTP connection for media stream delivery between the terminal and a media carrier entity.

11. The method of claim 10, wherein the negotiating by the MRF, the first address port for the RTSP connection to communicate with the terminal comprises:

controlling, by the media control entity, the media carrier entity to interact, and acquiring the first address port allocated by the media carrier entity for the RTSP connection with the terminal;

allocating, by the media control entity, a local address port for the RTSP connection; and returning, by the media control entity, a service request response to the terminal, wherein the service request response carries information about the local address port for RTSP connection of the media control entity.

12. The method of claim 11, wherein the negotiating by the media carrier entity the first address port for the RTP connection to communicate with the terminal under the control of the media control entity comprises:

delivering, by the terminal, a SETUP message to the media carrier entity over the RTSP connection, wherein the SETUP message carries the terminal's information about a second address port for the RTP connection;

forwarding, by the media control entity, the SETUP message to the media carrier entity when the media carrier entity is allowed to continue a service operation;

after receiving the SETUP message, allocating by the media carrier entity the address port for RTP connection under the control of the media control entity and returning the first address port for RTP connection to the media control entity;

returning, by the media control entity, a response to the SETUP message to the terminal, wherein the response carries information about the first address port allocated by the media carrier entity for the RTP connection.

13. The method of claim 11, wherein a protocol used by the media control entity when controlling the media carrier entity to interact is the H.248 protocol or a combination of the extensible Markup Language (XML) and the SIP.

14. The method of claim 10, wherein: the negotiating by the MRF the first address port for the RTSP connection to communicate with the terminal comprises:

allocating, by the media control entity, the first address port for the RTSP connection with the terminal;

returning, by the media control entity, a service request response to the terminal, wherein the service request response carries information about the first address port for the RTSP connection of the media control entity.

15. The method of claim 14, wherein the negotiating by the media carrier entity the first address port for the RTP connection to communicate with the terminal under the control of the media control entity comprises:

delivering, by the terminal, a SETUP message to the media control entity over the RTSP connection, wherein the SETUP message carries a second address port for the RTP connection of the terminal;

converting, by the media control entity, the SETUP message to an H.248 message or a SIP message and delivering the converted message to the media carrier entity when the media carrier entity is allowed to continue the service operation;

after receiving the H.248 message or the SIP message, allocating by the media carrier entity the first address port for RTP connection under the control of the media control entity and returning the allocated first address port for the RTP connection to the media control entity; and returning, by the media control entity, a response to the SETUP message to the terminal, wherein the response includes the first address port for the RTP connection allocated by the media carrier entity.

16. The method of claim 7, wherein: the interactive service request carries information about a second address port for the RTSP connection of the terminal and a second address port for the RTP connection;

the negotiating by the MRF the first address port for the RTSP connection and the first address port for the RTP connection to communicate with the terminal comprises:

controlling, by the media control entity, the media carrier entity to interact, and acquiring the first address port which is allocated by the media carrier entity for the RTSP connection and the first address port which is allocated by the media carrier entity for the RTP connection with the terminal;

allocating, by the media control entity, a local address port for RTSP connection;

returning, by the media control entity, a service request response to the terminal, the service request response carries the local address port for the RTSP connection of the media control entity and the first address port for the RTP connection of the media carrier entity.

17. The method of claim 7, wherein the interactive service request carries information about a second address port for RTSP connection and a second address port for RTP connection of the terminal;

the negotiating by the MRF the first address port for RTSP connection and the first address port for RTP connection to communicate with the terminal comprises:

allocating, by the media control entity, the first address port for RTSP connection with the terminal;

controlling, by the media control entity the media carrier entity to interact and acquiring the first address port allocated by the media carrier entity for RTP connection with the terminal;

returning, by the media control entity, a service request response to the terminal, wherein the service request response carries information about the first address port for RTSP connection of the media control entity and the first address port for RTP connection of the media carrier entity.

18. A method for establishing an interactive media session based on IP Multimedia Subsystem (IMS) network, comprising:

receiving, by a media control entity in the IMS network, an interactive service request initiated by a terminal via an application server;

negotiating, by the application server, an address port for RTSP connection to communicate with the terminal and establishing an RTSP connection with the terminal for interactive control;

negotiating, under the control of the media control entity, by a media carrier entity, an address port for the RTP connection to communicate with the terminal; and establishing an RTP connection for media stream delivery between the terminal and the media carrier entity.

19. The method of claim 18, wherein, the application server converts control information contained in an RTSP message from the terminal to an H.248 message or a SIP message and then delivers the H.248 message or the SIP message to the media control entity;

or the application server establishes an RTSP connection with the media control entity to forward an RTSP message from the terminal to the media control entity.

20. A method for establishing an interactive media session based on IP Multimedia Subsystem (IMS) network, comprising:

receiving, by a media control entity in the IMS network, an interactive service request initiated by a terminal;

negotiating, under the control of the media control entity, by a media carrier entity in the IMS network, an address port for Real-time Transport Protocol (RTP) connection to communicate with the terminal;

establishing an RTP connection for media stream delivery between the terminal and the media carrier entity;

delivering a Session Initiation Protocol (SIP) message to an Application Server (AS) by the terminal, wherein the SIP message carries media interactive control information;

acquiring, by the AS from the SIP message, the media interactive control information and converting the media interactive control information to an Real Time Stream Protocol (RTSP) message; and interacting, between the AS and a Multimedia Resource Function (MRF), through the RTSP message to exert interactive media control between a user and the MRF.

21. A method for establishing an interactive media session based on IP Multimedia Subsystem (IMS) network, comprising:

receiving, by a media control entity in the IMS network, an interactive service request initiated by a terminal;

negotiating, by a media carrier entity in the IMS network, an address port for RTP connection to communicate with the terminal under the control of the media control entity;

establishing an RTP connection for media stream delivery between the terminal and the media carrier entity;

delivering a SIP message to the media control entity by the terminal, the SIP message carrying media interactive control information;

acquiring, by the media control entity from the SIP message, the media interactive control information and converting the media interactive control information to an H.248 message; and controlling, by the media control entity, the media carrier entity to interact, so as to realize a media interactive control through the H.248 message.

22. A method for establishing an interactive media session based on IP Multimedia Subsystem (IMS) network, comprising:

receiving, by a media stream server which provides a service, an interactive service request initiated by a terminal;

negotiating, under a control of a controller of the media stream server, by the media stream server, an address port for RTP connection to communicate with the terminal;

establishing an RTP connection for media stream delivery between the terminal and the media stream server;

providing, by the terminal, media interactive control information through a SIP message extension; sending, by the IMS network, the SIP message to an MRF; and converting, by the MRF, the media interactive control information carried in the SIP message to an RTSP message and performing a media interactive control with a media server to realize the media interactive control between the terminal and the media stream server.

23. The method of claim 22, wherein the converting and performing comprises:

acquiring, by a media control entity, the media interactive control information from the SIP message and converting the media interactive control information to the RTSP message;

performing, by the media control entity, the media interactive control with the media server through the RTSP message.

24. The method of claim 22, wherein the converting and performing comprises:

acquiring, by a media control entity, the media interactive control information from the SIP message and converting the media interactive control information to an H.248 message, and controlling a media carrier entity to convert the media interactive control information to the RTSP message; and performing, by the media carrier entity, the media interactive control with the media server through the RTSP message.

25. A system for establishing an interactive media session based on IP Multimedia Subsystem (IMS) network, comprising an application server, a media control entity and a media carrier entity, wherein the application server, the media control entity and the media carrier entity are in the IMS network, the media carrier entity is in communication with a terminal, wherein the terminal is adapted to initiate an interactive service request and establish a Real Time Stream Protocol (RTSP) connection and a Real-time Transport Protocol (RTP) connection;

the application server is adapted to process the interactive service request;

the media control entity is adapted to control a resource allocation of the media carrier entity; and the media carrier entity is adapted to allocate, under a control of the media control entity, address ports for RTSP connection and RTP connection, and establish the RTSP connection and the RTP connection with the terminal.

26. The system of claim 25, wherein, the media control entity is a Multimedia Resource Function Controller (MRFC) or a functional entity independent of the MRFC; the media carrier entity is a Multimedia Resource Function Processor (MRFP) or a functional entity independent of the MRFP.

27. A system for establishing an interactive media session based on an IP Multimedia Subsystem (IMS) network, comprising: an application server, a media control entity, and a media carrier entity, wherein the application server, the media control entity and the media carrier entity are in the IMS network, the media carrier entity is in communication with a terminal, wherein the terminal is adapted to initiate an interactive service request and establish a Real Time Stream Protocol (RTSP) connection and a Real-time Transport Protocol (RTP) connection;

the application server is adapted to process the interactive service request;

the media control entity is adapted to control a resource allocation of the media carrier entity, and allocate an address port for RTSP connection to establish the RTSP connection with the terminal; and the media carrier entity is adapted to allocate an address port for RTP connection under a control of the media control entity and establish the RTP connection with the terminal.

28. The system of claim 27, wherein, the media control entity is a Multimedia Resource Function Controller (MRFC) or a functional entity independent of the MRFC; the media carrier entity is a Multimedia Resource Function Processor (MRFP) or a functional entity independent of the MRFP.

29. A media resource control device in an IP multimedia subsystem (IMS) network, comprising:

a first interactive unit, adapted to receive a request initiated by a terminal, and as a response, return to the terminal a first address port for establishing a RTSP connection and a first address port for establishing a RTP connection, wherein the request carries a second address port for establishing the RTSP connection and a second address port for establishing the RTP connection;

a control unit, adapted to control a media carrier entity to allocate the first address port for establishing the RTSP connection and the first address port for establishing the RTP connection, based on the request received by the first interactive unit.

30. The device of claim 29, wherein the request is an interactive service request, and the interactive service request carries information about the second address port for establishing the RTSP connection and the second address port for establishing the RTP connection of the terminal.

31. The device of claim 29, wherein the request includes an interactive service request delivered by the terminal before establishing the RTSP connection and a SETUP message delivered over the established RTSP connection by the terminal; the interactive service request carries information about the second address port for establishing the RTSP connection of the terminal, and the SETUP message carries information about the second address port for establishing the RTP connection of the terminal.

32. A media resource control device, comprising:
a first interactive unit, adapted to receive a request delivered by a terminal, and as a response, return to the terminal an address port for establishing an RTSP connection and an address port for establishing a RTP connection;

a port allocating unit, adapted to allocate the address port for establishing the RTSP connection based on the request received by the first interactive unit;

a control unit, for controlling a media carrier entity to allocate the address port for establishing the RTP connection with the terminal, based on the request received by the first interactive unit.

33. The device of claim 32, wherein the request is an interactive service request, the interactive service request carries an address port for establishing the RTSP connection and an address port for establishing the RTP connection of the terminal.

34. The device of claim 32, wherein the request includes an interactive service request delivered before establishing the RTSP connection and a SETUP message delivered over the established RTSP connection by the terminal; the interactive service request carries an address port for establishing the RTSP connection of the terminal, and the SETUP message carries information about the address port for establishing the RTP connection of the terminal.

* * * * *

UNITED STATES PATENT AND TRADEMARK OFFICE
CERTIFICATE OF CORRECTION

| | | |
|---|---|---|
| PATENT NO. | : 8,150,975 B2 | Page 1 of 1 |
| APPLICATION NO. | : 12/916164 | |
| DATED | : April 3, 2012 | |
| INVENTOR(S) | : Li et al. | |

It is certified that error appears in the above-identified patent and that said Letters Patent is hereby corrected as shown below:

On the Title page, item [75], the first-listed inventor's name should be spelled -- Jincheng Li --.

Signed and Sealed this
Thirty-first Day of July, 2012

David J. Kappos
*Director of the United States Patent and Trademark Office*